(12) United States Patent
Kim

(10) Patent No.: US 12,391,227 B2
(45) Date of Patent: Aug. 19, 2025

(54) ELECTRONIC BRAKE SYSTEM AND METHOD FOR CONTROLLING SAME

(71) Applicant: HL MANDO CORPORATION, Gyeonggi-do (KR)

(72) Inventor: Hakburm Kim, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 222 days.

(21) Appl. No.: 17/797,423

(22) PCT Filed: Feb. 4, 2021

(86) PCT No.: PCT/KR2021/001464
§ 371 (c)(1),
(2) Date: Aug. 3, 2022

(87) PCT Pub. No.: WO2021/158032
PCT Pub. Date: Aug. 12, 2021

(65) Prior Publication Data
US 2023/0092049 A1    Mar. 23, 2023

(30) Foreign Application Priority Data
Apr. 2, 2020   (KR) .................. 10-2020-0013295

(51) Int. Cl.
*B60T 8/94*   (2006.01)
*B60Q 9/00*   (2006.01)
(Continued)

(52) U.S. Cl.
CPC .................. *B60T 8/94* (2013.01); *B60Q 9/00* (2013.01); *B60T 7/042* (2013.01); *B60T 8/3205* (2013.01);
(Continued)

(58) Field of Classification Search
CPC .......... B60T 8/94; B60T 7/042; B60T 8/3205; B60T 8/326; B60T 8/58; B60T 17/22;
(Continued)

(56) References Cited

U.S. PATENT DOCUMENTS

2008/0015761 A1*  1/2008  Bellego ................... B60T 13/74
                                                                   303/20
2013/0035835 A1*  2/2013  Hachtel ................... B60T 17/18
                                                                   701/33.9
(Continued)

FOREIGN PATENT DOCUMENTS

CN      107914692          4/2018
CN      110341669 A    *  10/2019   ............ B60T 13/745
(Continued)

OTHER PUBLICATIONS

English Translation of DE-102016222578-A1 (Year: 2018).*
(Continued)

*Primary Examiner* — Peter D Nolan
*Assistant Examiner* — Preston Jay Miller
(74) *Attorney, Agent, or Firm* — WOMBLE BOND DICKINSON (US) LLP

(57) ABSTRACT

The present disclosure relates to an electronic brake system including a reservoir in which the pressurized medium is stored, a hydraulic pressure supply device provided to generate a hydraulic pressure by moving a hydraulic piston forward or backward and having a first pressure chamber provided on a front side of the hydraulic piston and a second pressure chamber provided on a rear side of the hydraulic piston, a hydraulic control unit provided to control a flow of the hydraulic pressure to be transmitted from the hydraulic pressure supply device to a wheel cylinder, a longitudinal acceleration sensor provided to detect a longitudinal acceleration of a vehicle, and a controller provided to control the
(Continued)

hydraulic pressure supply device and the hydraulic control unit, wherein the controller determines the hydraulic pressure generated by the hydraulic pressure supply device based on the longitudinal acceleration of the vehicle, determines a braking mode based on the determined hydraulic pressure, and performs the determined braking mode.

8 Claims, 9 Drawing Sheets

(51) Int. Cl.
 *B60T 7/04*  (2006.01)
 *B60T 8/32*  (2006.01)
 *B60T 8/58*  (2006.01)
 *B60T 17/22* (2006.01)

(52) U.S. Cl.
 CPC ............... *B60T 8/326* (2013.01); *B60T 8/58* (2013.01); *B60T 17/22* (2013.01); *B60T 2220/04* (2013.01); *B60T 2250/00* (2013.01); *B60T 2270/402* (2013.01); *B60T 2270/406* (2013.01); *B60T 2270/88* (2013.01); *B60Y 2400/90* (2013.01)

(58) Field of Classification Search
 CPC ........... B60T 2250/00; B60T 2270/402; B60T 2270/406; B60T 2270/88; B60T 11/16; B60T 11/22; B60T 13/662; B60T 13/745; B60T 8/172; B60T 8/329; B60Q 9/00; B60Y 2400/301; B60Y 2400/306; B60Y 2400/81; B60Y 2400/90
 USPC .......................................................... 701/70
 See application file for complete search history.

(56) References Cited

U.S. PATENT DOCUMENTS

| | | | | |
|---|---|---|---|---|
| 2013/0057054 | A1* | 3/2013 | Ishida | B60T 13/662 303/3 |
| 2016/0362095 | A1* | 12/2016 | Crombez | B60T 13/662 |
| 2018/0029577 | A1 | 2/2018 | Beauvais | |
| 2018/0099652 | A1* | 4/2018 | Jung | B60T 13/662 |
| 2018/0111593 | A1* | 4/2018 | Kim | B60T 8/88 |
| 2018/0229707 | A1* | 8/2018 | Son | B60T 13/686 |
| 2019/0366997 | A1* | 12/2019 | Jeong | B60T 13/167 |

FOREIGN PATENT DOCUMENTS

| | | | |
|---|---|---|---|
| DE | 102016222578 | A1 * | 5/2018 |
| JP | 7-257358 | | 10/1995 |
| JP | 5513603 | | 6/2014 |
| KR | 100243610 | B1 * | 3/2000 |
| KR | 10-2015-0065030 | | 6/2015 |
| KR | 10-2018-0039356 | | 4/2018 |
| KR | 10-1986847 | | 6/2019 |
| KR | 10-2019-0136256 | | 12/2019 |

OTHER PUBLICATIONS

English Translation of CN-110341669-A (Year: 2019).*
English Translation of KR-100243610-B1 (Year: 2000).*
Yuan et al., "A Novel Initiative Braking System With Nondegraded Fallback Level for ADAS and Autonomous Driving," 2019, IEEE (Year: 2019).*
International Search Report for PCT/KR2021/001464 mailed on Apr. 23, 2021 and its translation provided by WIPO (now published as WO 2021/158032).
Written Opinion of the International Searching Authority for PCT/KR2021/001464 mailed on Apr. 23, 2021 and its English Machine Translation by Google Translate (now published as WO 2021/158032).
Communication pursuant to Article 94(3) EPC dated Oct. 16, 2023 for European Patent Application No. 21 751 249.0.
Office Action dated Sep. 23, 2023 for Chinese Patent Application No. 202180012379.6 and its English translation from Global Dossier.
Extended European Search Report dated Jun. 7, 2023 for European Patent Application No. 21751249.0.
International Preliminary Report on Patentability (Chapter I) for PCT/KR2021/001464 issued on Jul. 28, 2022 and its English Machine Translation from WIPO (now published as WO 2021/158032).

* cited by examiner

ELECTRONIC BRAKE SYSTEM AND METHOD FOR CONTROLLING SAME

CROSS-REFERENCE TO RELATED APPLICATIONS

This application is the national stage of International Patent Application No. PCT/KR2021/001464 filed on Feb. 4, 2021, which claims priority to Korean Patent Application No. 10-2020-0013295 filed in the Korean Intellectual Property Office on Feb. 4, 2020, the disclosures of which are incorporated by reference herein in their entireties.

TECHNICAL FIELD

The present disclosure relates to an electronic brake system for generating a braking force depending on an electrical signal in response to a displacement of a brake pedal, and a control method thereof.

BACKGROUND ART

In general, an electronic brake system may include a hydraulic pressure supply device for generating a hydraulic pressure by moving a hydraulic piston using a rotational force of a motor and supplying the generated hydraulic pressure to a wheel cylinder provided on each of wheels, and a hydraulic control unit having a hydraulic circuit for controlling a flow of the hydraulic pressure to be transmitted to the wheel cylinder by the hydraulic pressure supply device.

Such an electronic brake system may detect a displacement of a brake pedal through a pedal displacement sensor for detecting the displacement of the brake pedal when a driver presses the brake pedal, determine a target pressure required by the driver based on the detected brake pedal displacement, set the determined target pressure required by the driver as a target pressure of the hydraulic circuit, detect a pressure of the hydraulic circuit through a pressure sensor, and generate a hydraulic pressure by moving the hydraulic piston using the rotational force of the motor so that the detected pressure of the hydraulic circuit reaches the set target pressure.

When the pressure sensor fails or a cut valve provided in a flow path on which the pressure sensor is installed fails, a signal from the pressure sensor may not be valid. In this case, the electronic brake system may switch to a degraded performance mode using a position control based on a motor position sensor instead of a normal braking mode using a feedback control based on the pressure sensor.

However, because in the degraded performance mode using the position control based on the motor position sensor, the electronic brake system controls only the motor position by feedback without feedback on the pressure of the hydraulic circuit, it is not known how an actual brake pressure is formed, and when the hydraulic piston moves forward by the rotation of the motor, but the brake pressure is not normally generated (e.g., when a leak occurs), a braking force of a vehicle may not be generated.

In this case, unless the degraded performance mode is switched to a fallback mode in which braking may be performed directly by the driver, the braking force of the vehicle may not be properly secured.

DISCLOSURE

Technical Problem

The present disclosure is directed to providing an electronic brake system capable of securing a braking force by adjusting a braking mode when a brake pressure is not normally formed during control in a degraded performance mode based on a motor position sensor, and a control method thereof.

Technical Solution

An aspect of the present disclosure provides an electronic brake system including a reservoir in which the pressurized medium is stored, a hydraulic pressure supply device provided to generate a hydraulic pressure by moving a hydraulic piston forward or backward and having a first pressure chamber provided on a front side of the hydraulic piston and a second pressure chamber provided on a rear side of the hydraulic piston, a hydraulic control unit provided to control a flow of the hydraulic pressure to be transmitted from the hydraulic pressure supply device to a wheel cylinder, a longitudinal acceleration sensor provided to detect a longitudinal acceleration of a vehicle, and a controller provided to control the hydraulic pressure supply device and the hydraulic control unit, wherein the controller determines the hydraulic pressure generated by the hydraulic pressure supply device based on the longitudinal acceleration of the vehicle, determines a braking mode based on the determined hydraulic pressure, and performs the determined braking mode.

The controller may determine the hydraulic pressure generated by the hydraulic pressure supply device based on the longitudinal acceleration of the vehicle when controlling in a degraded performance mode in which braking performance is degraded more than in a normal braking mode.

The degraded performance mode may be a degraded performance mode based on a motor position sensor provided to detect a rotational position of a motor.

The controller may determine the braking mode based on the determined hydraulic pressure compared to a target pressure.

The electronic brake system may further include a pedal displacement sensor provided to detect a displacement of a brake pedal, wherein the controller may determine the target pressure depending on the displacement detected through the pedal displacement sensor.

The controller may determine whether brake pressure formation is abnormal based on the determined hydraulic pressure compared to the target pressure.

The controller may determine that the brake pressure formation is abnormal when the determined hydraulic pressure compared to the target pressure is lower than a preset value.

The controller may determine the braking mode as a fallback mode when the brake pressure formation is abnormal.

The controller may warn a driver when the brake pressure formation is abnormal.

Another aspect of the present disclosure provides an electronic brake system including a reservoir in which the pressurized medium is stored, a hydraulic pressure supply device provided to generate a hydraulic pressure by moving a hydraulic piston forward or backward and having a first pressure chamber provided on a front side of the hydraulic piston and a second pressure chamber provided on a rear side of the hydraulic piston, a hydraulic control unit provided to control a flow of the hydraulic pressure to be transmitted from the hydraulic pressure supply device to a wheel cylinder, a pressure sensor provided to detect a pressure in a hydraulic circuit, a motor position sensor provided to detect a rotational position of a motor, a longitudinal acceleration sensor provided to detect a longitudinal acceleration of a vehicle, a pedal displacement sensor provided to detect a displacement of a brake pedal, and a controller provided to control the hydraulic pressure supply device and the hydraulic control unit, wherein the controller converts a braking mode from a normal braking mode to a degraded performance mode based on the motor position sensor when the pressure sensor fails while the brake pedal is operated or a cut valve provided in a flow path in which the pressure sensor is installed fails, determines the hydraulic pressure generated by the hydraulic pressure supply device based on the longitudinal acceleration of the vehicle when controlling in the degraded performance mode, determines a target pressure based on the displacement of the brake pedal, determines whether brake pressure formation is abnormal based on the determined hydraulic pressure compared to the determined target pressure, and converts the degraded performance mode to a fallback mode when the brake pressure formation is abnormal.

Another aspect of the present disclosure provides a control method of an electronic brake system, which includes a reservoir in which the pressurized medium is stored, a hydraulic pressure supply device provided to generate a hydraulic pressure by moving a hydraulic piston forward or backward and having a first pressure chamber provided on a front side of the hydraulic piston and a second pressure chamber provided on a rear side of the hydraulic piston, and a hydraulic control unit provided to control a flow of the hydraulic pressure to be transmitted from the hydraulic pressure supply device to a wheel cylinder, including detecting a longitudinal acceleration of a vehicle through a longitudinal acceleration sensor, determining the hydraulic pressure generated by the hydraulic pressure supply device based on the detected longitudinal acceleration, determining a braking mode based on the determined hydraulic pressure, and performing the determined braking mode.

The determining of the hydraulic pressure may include determining the hydraulic pressure generated by the hydraulic pressure supply device based on the detected longitudinal acceleration when controlling in a degraded performance mode in which braking performance is degraded more than in a normal braking mode.

In the determining of the hydraulic pressure, the degraded performance mode may be a degraded performance mode based on the motor position sensor provided to detect the rotational position of the motor.

The determining of the braking mode may include determining the braking mode based on the determined hydraulic pressure compared to a target pressure.

In the determining of the braking mode, the target pressure may be determined depending on a pedal displacement detected through a pedal displacement sensor.

The determining of the braking mode may include determining whether brake pressure formation is abnormal based on the determined hydraulic pressure compared to the target pressure.

In the determining of the braking mode, it may be determined that the brake pressure formation is abnormal when the determined hydraulic pressure compared to the target pressure is lower than a preset value.

The determining of the braking mode may include determining the braking mode as a fallback mode when the brake pressure formation is abnormal.

The determining of the braking mode may include warning a driver when the brake pressure formation is abnormal.

Advantageous Effects

According to an aspect of the present disclosure, when a brake pressure is not normally formed during control in a degraded performance mode based on a motor position sensor, a braking force can be secured by changing a braking mode.

According to another aspect of the present disclosure, when the brake pressure is not normally formed during control in the degraded performance mode based on the motor position sensor, the braking force can be secured by switching the braking mode to a fallback mode.

MODE OF THE DISCLOSURE

Figure 1:
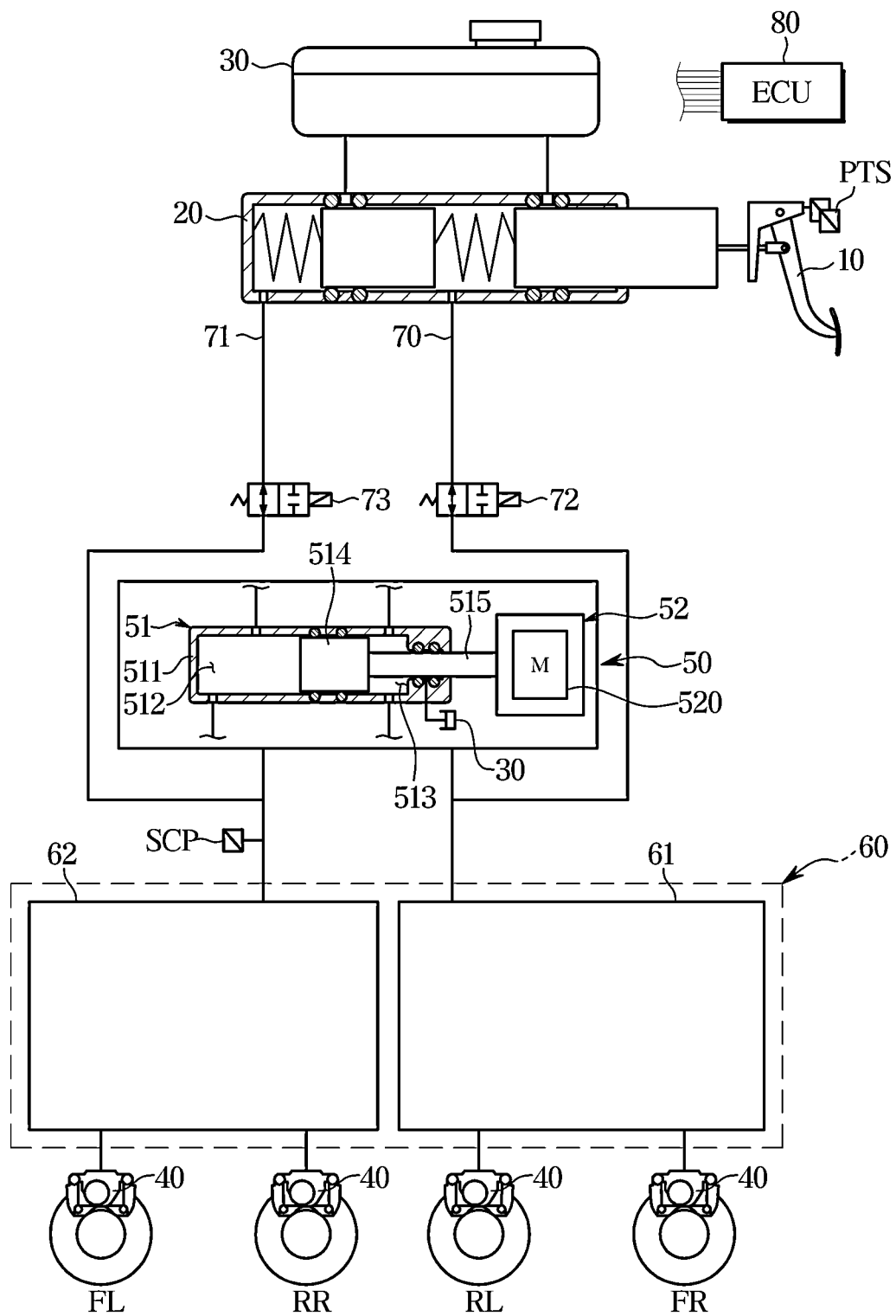
FIG. 1 illustrates a hydraulic circuit diagram of an electronic brake system according to an embodiment.

Throughout the specification, like reference numerals refer to like elements. This specification does not describe all the elements of the embodiments, and duplicative contents between general contents or embodiments in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

Throughout the specification, when a member is described as being "on" another member, this includes not only a case in which a member is in contact with another member but also a case in which another member is present between the two members.

The terms 'first,' 'second,' etc. are used to distinguish one element from another element, and the elements are not limited by the above-mentioned terms. The singular forms "a," "an," and the include plural referents unless the context clearly dictates otherwise.

In each step, an identification numeral is used for convenience of explanation, the identification numeral does not describe the order of the steps, and each step may be performed differently from the order specified unless the context clearly states a particular order.

FIG. 1 illustrates a hydraulic circuit diagram of an electronic brake system according to an embodiment.

Referring to FIG. 1, an electronic brake system may include a master cylinder 20 provided to pressurize and discharge a pressurized medium accommodated therein by an operation of a brake pedal 10, a reservoir 30 coupled to an upper side of the master cylinder 20 to store the pressurized medium, a wheel cylinder 40 provided on each of wheels RR, RL, FR, and FL, a hydraulic pressure supply device 50 provided to generate a hydraulic pressure by operating by an electrical signal in response to a displacement of the brake pedal 10 and supply the generated hydraulic pressure to the wheel cylinder 40 provided on each of the wheel RR, RL, FR, and FL, a hydraulic pressure control unit 60 provided to control a flow of the hydraulic pressure to be transmitted to each of the wheel cylinders 40 by the hydraulic pressure supply device 50, and a controller (ECU) 80 provided to control the hydraulic pressure supply device 50, the hydraulic pressure control unit 60, and various valves based on hydraulic pressure information and pedal displacement information.

The hydraulic pressure supply device 50 may be provided to receive a braking intention of a driver as an electrical signal from a pedal displacement sensor PTS detecting the displacement of the brake pedal 10 and to generate a hydraulic pressure of the pressurized medium through mechanical operation.

The hydraulic pressure supply device 50 may include a hydraulic pressure providing unit 51 to provide a pressure of the pressurized medium to be transmitted to each of the wheel cylinders 40, and a motor-driven actuator 52 to operate the hydraulic pressure providing unit 51 using a motor 520.

The hydraulic pressure providing unit 51 may include a cylinder block 511 provided such that the pressurized medium may be accommodated therein, a hydraulic piston 514 accommodated in the cylinder block 511, and a drive shaft 515 provided to transmit power output from the motor-driven actuator 52 to the hydraulic piston 514. The cylinder block 511 may include a first pressure chamber 512 positioned in front of the hydraulic piston 514, and a second pressure chamber 513 positioned in the rear of the hydraulic piston 514.

The hydraulic pressure supply device 50 may transmit the hydraulic pressure to the hydraulic control unit 60 as the hydraulic piston 514, which is moved by a driving force of the motor 520, pushes the pressurized medium in the first pressure chamber 512 or the second pressure chamber 513.

The hydraulic pressure supply device 50 may be provided as a device having various methods and structures.

The hydraulic control unit 60 may include a first hydraulic circuit 61 configured to receive and control the hydraulic pressure to be transmitted to two of the wheel cylinders, and a second hydraulic circuit 62 configured to control the hydraulic pressure to be transmitted to the other two of the wheel cylinders. For example, the first hydraulic circuit 61 may control the right front wheel FR and the left rear wheel RL, and the second hydraulic circuit 62 may control the left front wheel FL and the right rear wheel RR. The present disclosure is not limited thereto, and the positions of the wheel cylinders connected to the first hydraulic circuit 61 and the second hydraulic circuit 62 may vary.

The hydraulic control unit 60 may include an inlet valve provided at a front end of each of the wheel cylinders 40 to control the hydraulic pressure, and an outlet valve branched between the inlet valve and the wheel cylinder 40 to be connected to the reservoir 30. The hydraulic pressure supply device 50 and a front end of the inlet valve of the first hydraulic circuit 61 may be connected, and the hydraulic pressure supply device 50 and a front end of the inlet valve of the second hydraulic circuit 62 may be connected. The hydraulic pressure generated and provided by the hydraulic pressure supply device 50 may be supplied to the first hydraulic circuit 61 and the second hydraulic circuit 62.

Backup flow paths 70 and 71 are flow paths that are used in a fallback mode in which braking of the wheel cylinders 40 may be executed by directly supplying the hydraulic pressure discharged from the master cylinder 20 to the hydraulic control unit 60 when the electronic brake system may not operate normally due to a failure of the hydraulic pressure supply device 50 or the like.

The backup flow paths 70 and 71 may include the first backup flow path 70 to connect the first cylinder chamber of the master cylinder 20 and the first hydraulic circuit 61, and the second backup flow path 71 to connect the second cylinder chamber of the master cylinder 20 and the second hydraulic circuit 62.

A first cut valve 72 may be installed in the first backup flow path 70 to control the flow of hydraulic pressure.

A second cut valve 73 may be installed in the second backup flow path 71 to control the flow of hydraulic pressure.

The first cut valve 72 and the second cut valve 73 may be provided as a normally open type solenoid valve that operates to be closed when a closing signal is received from the controller 80 in a normally open state. When it is necessary to simplify the structure of a device by reducing the number of valves, the cut valve may not be installed in one of the first backup flow path 70 and the second backup flow path 71 in which a pressure sensor is not installed.

Reference numeral SCP may be a circuit pressure sensor for detecting the hydraulic pressure in the hydraulic circuit.

Hereinafter, a braking control operation of the electronic brake system having the above components will be described.

When the driver operates the brake pedal 10, the controller 80 may close a flow path between the master cylinder 20 and the hydraulic control unit 60 by closing the first cut valve 72 and the second cut valve 73, thereby preventing the hydraulic pressure from being transmitted to each of the wheel cylinders 40.

At the same time, the controller 80 may actuate the hydraulic pressure supply device 50.

The controller 80 may generate a hydraulic pressure by operating the hydraulic pressure supply device 50. For example, a hydraulic pressure may be generated in the pressure chamber by moving the hydraulic piston 514 by an operation of the motor 520 of the hydraulic pressure supply device 50. The hydraulic pressure generated by the hydraulic pressure supply device 50 may be supplied to each of the wheel cylinders 40 by being transmitted to the first hydraulic circuit 61 and the second hydraulic circuit 62 of the hydraulic control unit 60, thereby braking each wheel.

Figure 2:
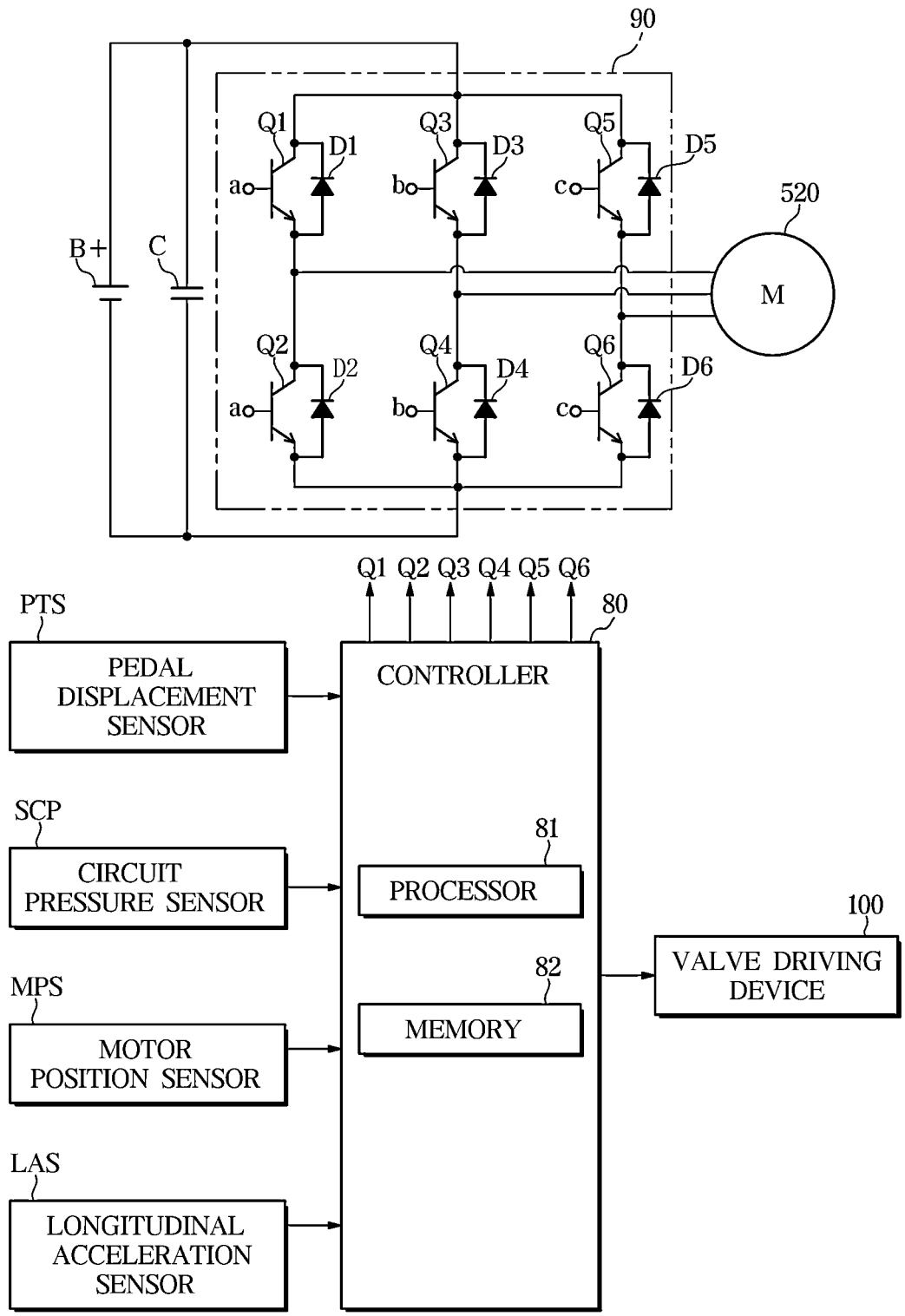
FIG. 2 illustrates a control block diagram of the electronic brake system according to an embodiment.

FIG. 2 illustrates a control block diagram of the electronic brake system according to an embodiment.

Referring to FIG. 2, the electronic brake system may include the controller 80 that performs overall control.

An inverter 90 and a valve driving device 100 may be electrically connected to an output side of the controller 80.

The pedal displacement sensor PTS, the circuit pressure sensor SCP and a motor position sensor MPS may be provided on an input side of the controller 80.

A vehicle battery B+ serving as a DC power source and a DC link capacitor C for smoothing a voltage signal may be electrically connected to the inverter 90. The DC link capacitor C may be connected in parallel to the battery B+. The DC link capacitor C may smooth a DC voltage supplied from the battery B+ for a vehicle. The DC voltage smoothed by the DC link capacitor C may be supplied to the inverter 90.

The inverter 90 may drive the motor 520 by converting the DC voltage into a three-phase AC voltage in the form of a pulse having an arbitrary variable frequency through pulse width modulation (PWM). The inverter 90 may include a plurality of power switching elements and a plurality of diodes. For example, the inverter 90 may include six power switching elements Q1 to Q6 and six diodes D1 to D6.

The inverter 90 may convert the current supplied from the battery B+ into an alternating current from a direct current by turning on or off each of the power switching elements Q1 to Q6 depending on a control signal of the controller 80 and supply the converted alternating current to the motor 520. In this case, the voltage of the battery B+ may be boosted by a converter and supplied to the inverter 90.

The valve driving device 100 may drive various solenoid valves of the electromagnetic brake system including the first cut valve 72 and the second cut valve 73.

The pedal displacement sensor PTS may detect the operation and displacement of the brake pedal 10.

The circuit pressure sensor SCP may detect a pressure in the second hydraulic circuit 62. The circuit pressure sensor SCP may also detect a pressure in the first hydraulic circuit 61. The circuit pressure sensor SCP may detect a hydraulic pressure in at least one of the first hydraulic circuit 61 and the second hydraulic circuit 62.

The motor position sensor MPS may detect a rotational position and rotation speed of the motor 520. The motor position sensor MPS may include at least one Hall sensor for detecting a position of a rotor. The Hall sensor is a sensor to which a current magnetic effect called the Hall effect is applied. The Hall effect refers to a phenomenon in which an electromotive force (Hall voltage) is generated at opposite ends of a compound semiconductor when a current flows through the compound semiconductor and a magnetic field is applied to the compound semiconductor at a right angle. When a Hall voltage is measured using this phenomenon, it may be determined whether the applied magnetic field is the N pole or the S pole. The Hall sensor is a sensor capable of detecting a change in a pole of a permanent magnet provided in the rotor using the above principle to determine the position or speed of the rotor.

A longitudinal acceleration sensor LAS may detect a longitudinal acceleration of a vehicle. The longitudinal acceleration sensor LAS, which is an element that detects changes in speed per unit time, may detect a dynamic force such as acceleration, vibration, and impact, and may measure using the principles of inertial force, electric strain, and gyro.

The pedal displacement sensor PTS, the circuit pressure sensor SCP, the motor position sensor MPS, and the longitudinal acceleration sensor LAS may transmit each detected information to the controller 80.

The controller 80 may be referred to as an electronic control unit (ECU).

The controller 80 may include a processor 81 and a memory 82.

The memory 82 may temporarily store detection data received from the pedal displacement sensor PTS, the circuit pressure sensor SCP, the motor position sensor MPS, and the longitudinal acceleration sensor LAS, and may temporarily store a processing result of the detection data by the processor 81.

The memory 82 may include not only a volatile memory such as a S-RAM and a D-RAM, but also a non-volatile memory such as a flash memory, a read-only memory (ROM), and an erasable programmable read-only memory (EPROM).

The processor 81 may drive the motor 520 through the inverter 90 based on a variety of information detected through the pedal displacement sensor PTS, the circuit pressure sensor SCP, the motor position sensor MPS, and the longitudinal acceleration sensor LAS, and may drive various solenoid valves of the electronic brake system through the valve driving device 100.

The processor 81 may generate a hydraulic pressure by the movement of the piston 514 by driving the motor 520 and various solenoid valves, and may brake each wheel by supplying the generated hydraulic pressure to the wheel cylinder 40 provided at each wheel.

The processor 81 may determine a target pressure depending on a pedal displacement detected through the pedal displacement sensor PTS.

The processor 81 may convert a pedal displacement value operated by the driver into a pressure value to determine the target pressure.

The processor 81 may determine a preset pressure corresponding to the pedal displacement detected by the pedal displacement sensor PTS among preset pressures corresponding to pedal displacements as the target pressure. The larger the pedal displacement, the higher the target pressure may be set. The smaller the pedal displacement, the lower the target pressure may be set.

The processor 81 may detect a motor position through the motor position sensor NIPS.

The processor 81 may determine an amount of movement of the hydraulic piston 514 from a change in the motor position. An amount of movement in which the hydraulic piston 514 moves from an origin position to a current position may be determined from a change in the motor position.

The processor 81 may determine an estimated pressure by converting the amount of movement of the hydraulic piston 514 into a pressure value. As the hydraulic piston 514 moves forward, the pressure in the pressure chamber may increase while a volume of the pressure chamber may decrease. The pressure may be converted from the amount of movement the hydraulic piston 514 moves in the same volume. This pressure may be determined as an estimated pressure.

The processor 81 may determine a pressure in the second hydraulic circuit 62 detected through the circuit pressure sensor SCP as a circuit pressure. When the circuit pressure sensor SCP is provided in the first hydraulic circuit 61 to detect the pressure in the first hydraulic circuit 61, the processor 81 may determine the pressure in the first hydraulic circuit 61 as the circuit pressure.

The processor 81 may detect the displacement of the brake pedal 10 through the pedal displacement sensor PTS in a normal braking mode, determine the target pressure based on the detected brake pedal displacement, set the determined target pressure as a target pressure in the second hydraulic circuit 62, detect a pressure in the second hydraulic circuit 62 through the circuit pressure sensor SCP, generate a hydraulic pressure by moving the hydraulic piston 514 using a rotational force of the motor 520 so that the detected pressure in the second hydraulic circuit 62 reaches the set target pressure.

When the circuit pressure sensor SCP fails or the second cut valve 73 provided on the second backup flow path 71 in which the circuit pressure sensor SCP installed fails, during control in a normal braking mode, the processor 81 may convert the normal braking mode to a degraded performance mode in which braking performance is degraded compared to the normal braking mode.

Figure 3:
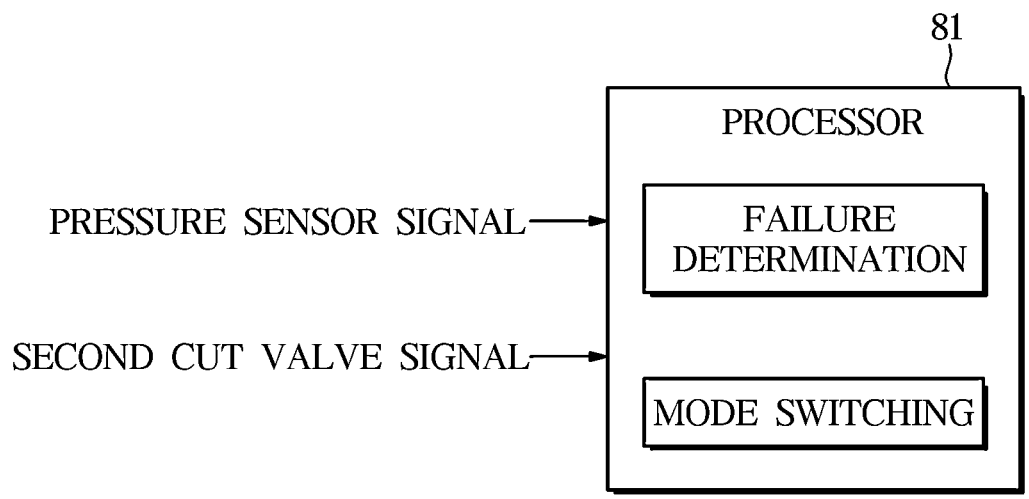
FIG. 3 illustrates a block diagram for determining occurrence of a failure of the electronic brake system according to an embodiment.

FIG. 3 illustrates a block diagram for determining occurrence of a failure of the electronic brake system according to an embodiment.

Referring to FIG. 3, the processor 81 may receive a pressure sensor signal output from the circuit pressure sensor SCP and a second cut valve signal output from the second cut valve 73 provided on the second backup flow path 71 in which the circuit pressure sensor SCP is installed, determine a failure of the circuit pressure sensor SCP depending on the received pressure sensor signal, and determine a failure of the second cut valve 73 depending on the second cut valve signal.

Because the pressure sensor signal is not valid when the circuit pressure sensor SCP fails or the second cut valve 73 fails, the braking mode based on the circuit pressure sensor SCP may not be performed.

Therefore, in this case, the processor 81 converts the braking mode from the normal braking mode to a degraded performance mode in which the braking performance in the normal braking mode is degraded, so that the braking force may be maximally formed even when the circuit pressure sensor SCP or the second cut valve 73 fails.

Figure 4:
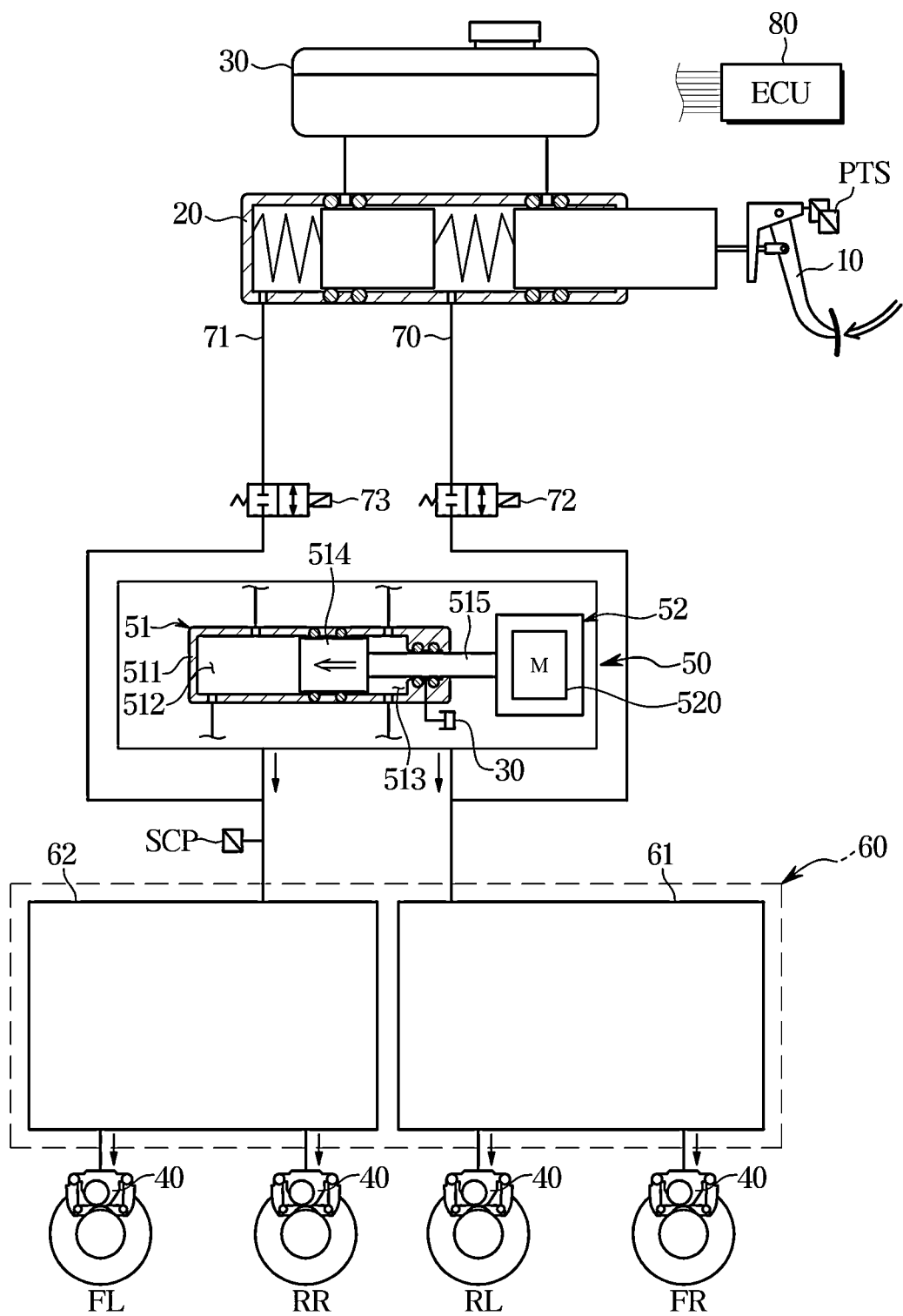
FIG. 4 illustrates a hydraulic circuit diagram in a degraded performance mode of the electronic brake system according to an embodiment.

FIG. 4 illustrates a hydraulic circuit diagram in a degraded performance mode of the electronic brake system according to an embodiment.

The processor 81 may convert the normal braking mode to the degraded performance mode when the circuit pressure sensor SCP and the second cut valve 73 fail during control in the normal braking mode.

In the normal braking mode, the first cut valve 72 and the second cut valve 73 may be closed to close the flow path between the master cylinder 20 and the hydraulic control unit 60. At the same time, the motor 520 of the hydraulic pressure supply device 50 may be operated to move the hydraulic piston 514 so as to generate a hydraulic pressure. In this case, the motor 520 may be driven such that the pressure in the second hydraulic circuit 62 detected through the circuit pressure sensor SCP reaches the set target pressure.

As such, the normal braking mode may be a braking mode based on the circuit pressure sensor SCP.

The degraded performance mode may be a braking mode in which the braking performance of the normal braking mode is degraded. The degraded performance mode may be a braking mode in which a maximum pressure, motor speed, or pressing method in the normal braking mode is limited. As a backward pressing method is not performed and only a forward pressing method is performed, the pressing method may be limited to the forward pressing method.

In the degraded performance mode, the first cut valve 72 and the second cut valve 73 may be closed to close the flow path between the master cylinder 20 and the hydraulic control unit 60. At the same time, the motor 520 of the hydraulic pressure supply device 50 is operated to move the hydraulic piston 514 so as to generate a hydraulic pressure. At this time, a motor position may be detected through the motor position sensor MPS, an amount of movement of the hydraulic piston 514 may be determined from a change in the detected motor position, an estimated pressure may be determined by converting the amount of movement of the hydraulic piston 514 into a pressure value, and a hydraulic pressure may be generated by moving the hydraulic piston 514 using the rotational force of the motor 520 so that the determined estimated pressure reaches the target pressure set to match the limited performance.

As such, the degraded performance mode may be a degraded performance mode based on the motor position sensor MPS.

As described above, when the circuit pressure sensor SCP fails or the second cut valve 73 fails during control in the normal braking mode based on the pressure sensor, the pressure sensor signal may be not valid. In this case, the braking mode may be switched to the degraded performance mode based on the motor position sensor.

However, because in the degraded performance mode based on the motor position sensor, the control is performed by feeding back only the motor position without feedback on the pressure in the hydraulic circuit, it is not known how an actual brake pressure is formed, and when the hydraulic piston moves forward by the rotation of the motor, but a brake pressure is not normally generated (e.g., when a leak occurs), a braking force of the vehicle may not be generated. In this case, unless the degraded performance mode is switched to the fallback mode in which braking may be directly executed by the driver, the braking force of the vehicle may not be properly secured.

Figure 5:
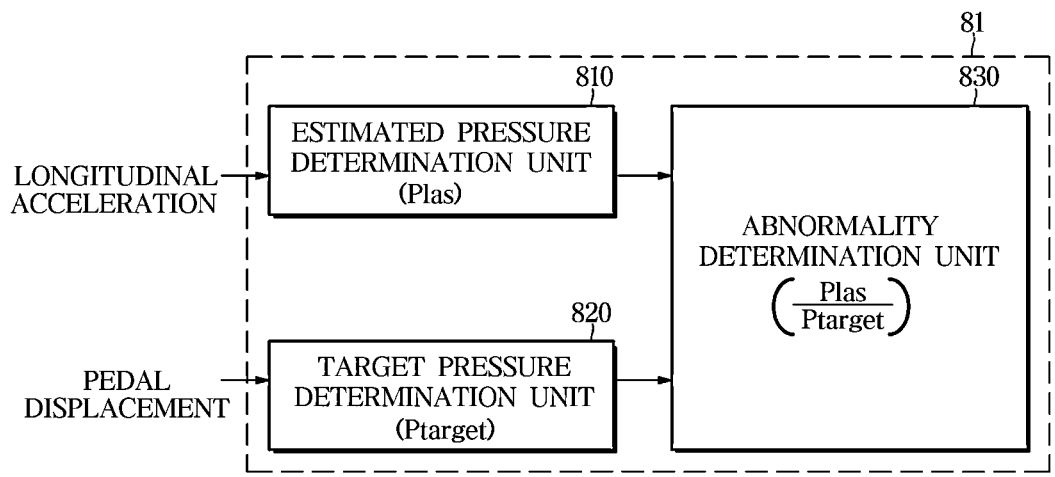
FIG. 5 illustrates a block diagram for determining whether a brake pressure is abnormal using a target pressure and an estimated pressure in the electronic brake system according to the embodiment.

FIG. 5 illustrates a block diagram for determining whether a brake pressure is abnormal using a target pressure and an estimated pressure in the electronic brake system according to the embodiment.

Referring to FIG. 5, the processor 81 may include an estimated pressure determination unit 810, a target pressure determination unit 820, and an abnormality determination unit 830.

The estimated pressure determination unit 810 may determine the estimated pressure (brake pressure) based on the longitudinal acceleration detected through the longitudinal acceleration sensor LAS. Because determining the brake pressure depending on the longitudinal acceleration is disclosed in detail in Korean Patent Application Laid-Open No. 10-2018-0039356 (published on Apr. 18, 2018), a detailed description thereof will be omitted.

The target pressure determination unit 820 may determine the target pressure depending on the pedal displacement detected through the pedal displacement sensor PTS.

The abnormality determination unit 830 may determine whether brake pressure formation is normal or abnormal based on an estimated pressure Plas determined by the estimated pressure determination unit 810 and a target pressure Ptarget determined by the target pressure determination unit 820.

The abnormality determination unit 830 may determine whether the brake pressure formation is normal or abnormal based on a ratio of the estimated pressure to the target pressure.

The abnormality determination unit 830 may determine that the brake pressure formation is normal when the ratio of the estimated pressure to the target pressure is higher than a preset value, and may determine that the brake pressure formation is abnormal when the ratio is lower than the preset value.

The processor 81 having the above configuration may estimate a hydraulic pressure generated by the hydraulic pressure supply device 50 based on the longitudinal acceleration of the vehicle, determine the braking mode based on the estimated hydraulic pressure, and perform the determined braking mode.

The processor 81 may estimate the hydraulic pressure generated by the hydraulic pressure supply device 50 based on the longitudinal acceleration of the vehicle when controlling in the degraded performance mode in which the braking performance is degraded more than in the normal braking mode. In this case, the degraded performance mode may be a degraded performance mode based on the motor position sensor MPS for detecting the rotational position of the motor 520.

The processor 81 may determine whether the brake pressure formation is abnormal when controlling in the degraded performance mode based on the motor position sensor MPS, and may switch the braking mode from the degraded performance mode to the fallback mode by determining that a failure has occurred when the brake pressure formation is abnormal.

Figure 6:
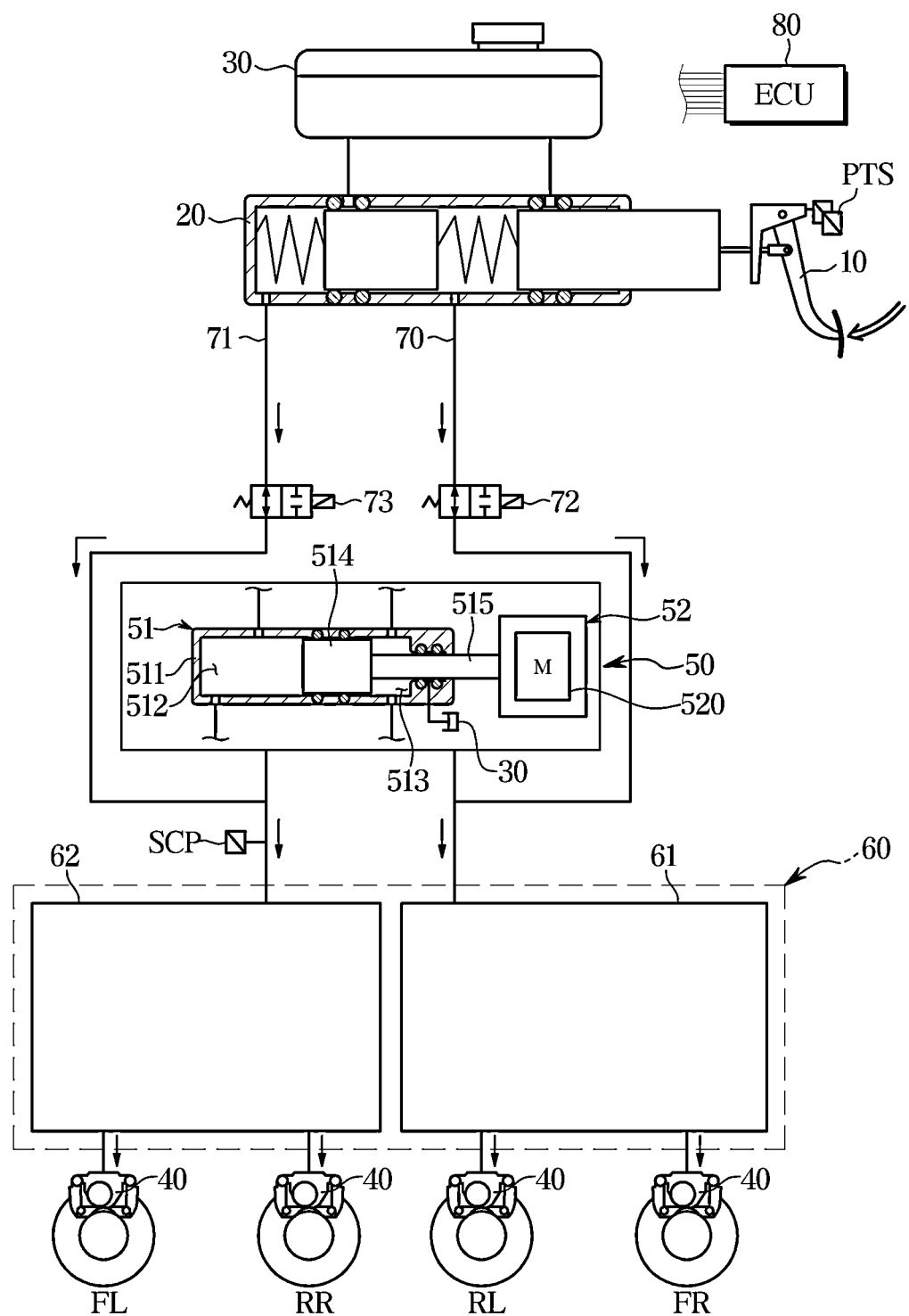
FIG. 6 illustrates a hydraulic circuit diagram in a fallback mode of the electronic brake system according to an embodiment.

FIG. 6 illustrates a hydraulic circuit diagram in a fallback mode of the electronic brake system according to an embodiment.

Referring to FIG. 6, the processor 81 may open the first cut valve 72 and the second cut valve 73 in the fallback mode to open the flow path between the master cylinder 20 and the hydraulic control unit 60 and at the same time, to stop the motor 520 of the hydraulic pressure supply device 50. In addition, various valves of the hydraulic control unit 60 may be controlled to be in an initial state.

Therefore, because the hydraulic pressure generated by the master cylinder 20 is directly supplied to the hydraulic circuits 61 and 62 and each of the wheel cylinders 40 through the backup flow paths 70 and 71, braking may be executed directly by the driver.

Figure 7:
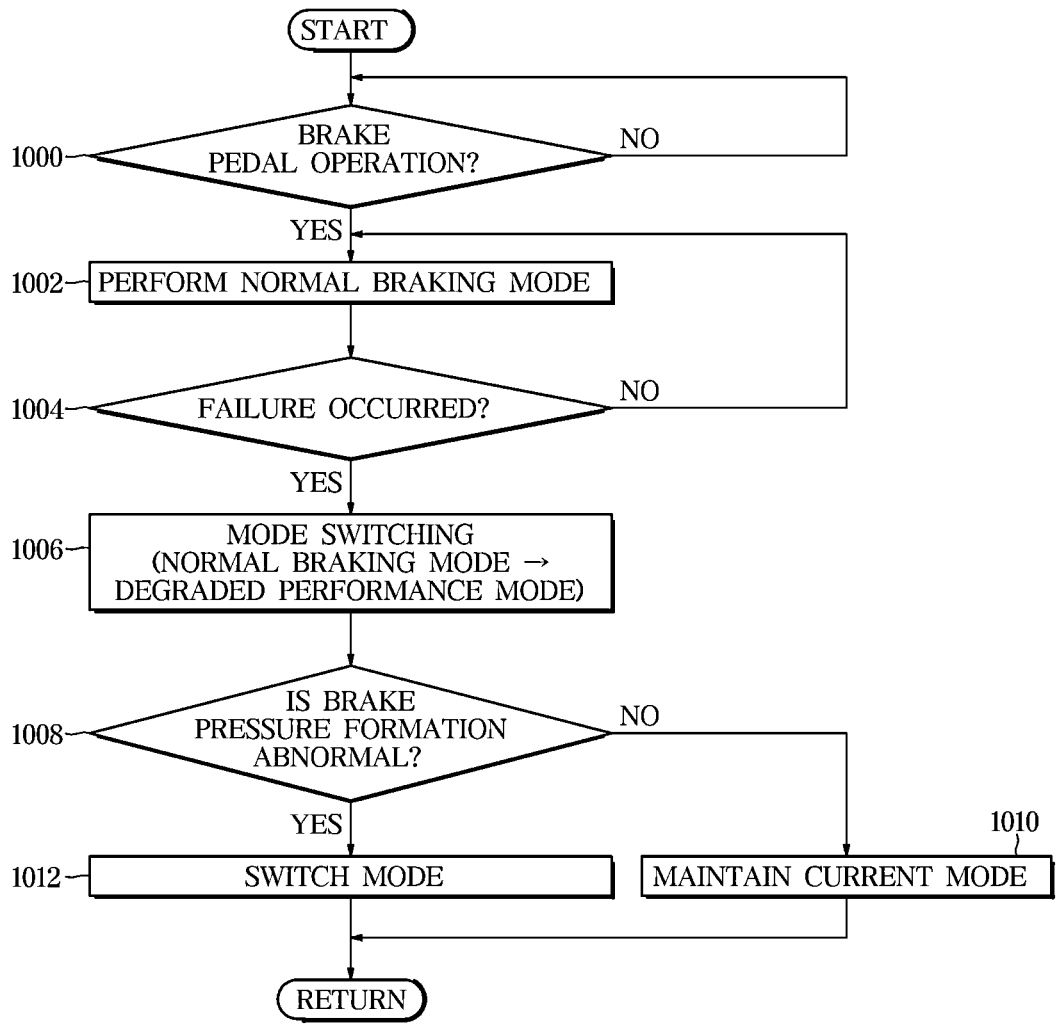
FIG. 7 illustrates a control method of the electronic brake system according to an embodiment.

FIG. 7 illustrates a control method of the electronic brake system according to an embodiment.

Referring to FIG. 7, when the driver operates the brake pedal 10 (1000), the controller 80 may perform the normal braking mode (1002). In the normal braking mode, the controller 80 may generate a hydraulic pressure by closing the first cut valve 72 and the second cut valve 73 and at the same time, operating the motor 520 of the hydraulic pressure supply device 50 to move the hydraulic piston 514, and may brake each of the wheels by supplying the generated hydraulic pressure to the wheel cylinders 40 provided at each of the wheels.

The controller 80 may determine whether a failure has occurred in the circuit pressure sensor SCP or the second cut valve 73 when controlling in the normal braking mode (1004).

When a failure does not occur as a result of determination in operation 1004, the controller 80 may maintain the current normal braking mode.

On the other hand, when a failure occurs as the result of the determination of the operation mode 1004, the controller 80 may switch the braking mode from the normal braking mode to the degraded performance mode (1006).

The controller 80 may determine whether the brake pressure formation is abnormal during control in the degraded performance mode (1008). In this case, the controller 80 may warn the driver that the brake pressure formation is abnormal through various display devices or speakers of the vehicle.

When the brake pressure formation is normal as a result of the determination of the operation 1008, the operation in the current degraded performance mode under control may be maintained (1010).

On the other hand, when the brake pressure formation is abnormal as the result of the determination of the operation 1008, to enable emergency braking, the braking mode may be switched from the degraded performance mode under control to a mode in which braking may be executed directly by the driver (1012).

Figure 8:
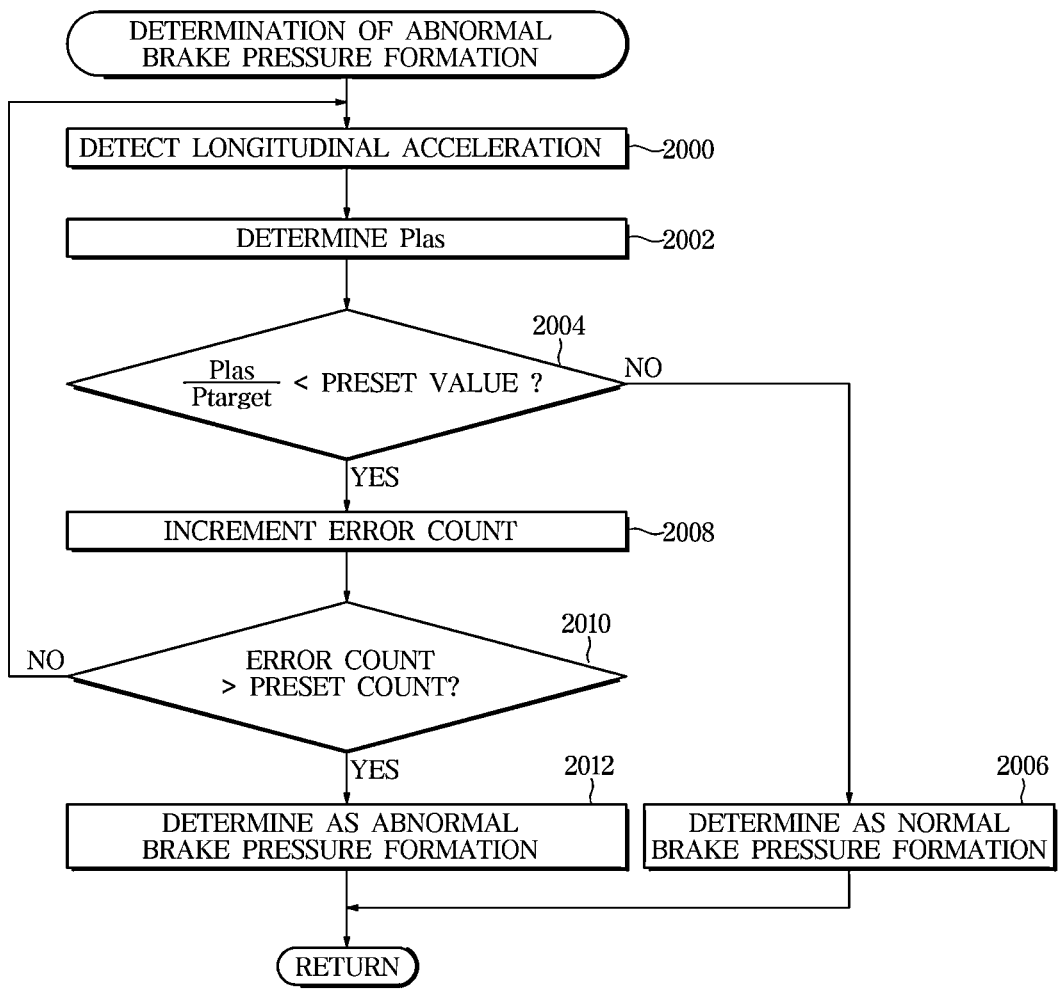
FIG. 8 illustrates a control flow for determining whether the brake pressure is abnormal in the electronic brake system according to an embodiment.

FIG. 8 illustrates a control flow for determining whether the brake pressure is abnormal in the electronic brake system according to an embodiment.

Referring to FIG. 8, the controller 80 may detect a longitudinal acceleration of the vehicle through the longitudinal acceleration sensor LAS (2000).

The controller 80 may determine the estimated pressure Plas depending on the detected longitudinal acceleration (2002).

The controller 80 may determine whether a ratio of the determined estimated pressure Plas to the target pressure Ptarget determined depending on the pedal displacement detected through the pedal displacement sensor PTS is less than a preset value (2004).

When the ratio of the determined estimated pressure Plas to the target pressure Ptarget is greater than or equal to the preset value as a result of the determination in operation 2004, the controller 80 may determine that the brake pressure formation is normal (2006). That is, as the hydraulic pressure generated by the movement of the hydraulic piston 514 is transmitted to the hydraulic control unit 60 without leakage, it may be determined that the actual braking force is in a state of maintaining the braking force expected in the degraded performance mode.

On the other hand, when the ratio of the determined estimated pressure Plas to the target pressure Ptarget is less than the preset value as the result of the determination in operation 2004, the controller 80 may increment the error count (2008).

The controller 80 may determine whether the incremented error count exceeds a preset count by comparing the counted error count with the preset count (2010).

When the incremented error count is equal to or less than the preset count as a result of the determination of operation 2010, the controller 80 may move to operation 2000 to perform the following operations.

On the other hand, when the incremented error count exceeds the preset count as the result of determination in operation 2010, the controller 80 may determine that the brake pressure formation is abnormal (2012). That is, as the hydraulic pressure generated by the movement of the hydraulic piston 515 is not sufficiently transmitted to the hydraulic control unit 60 due to the leak, it is determined that the actual braking force is more reduced than the braking force expected in the degraded performance mode.

Figure 9:
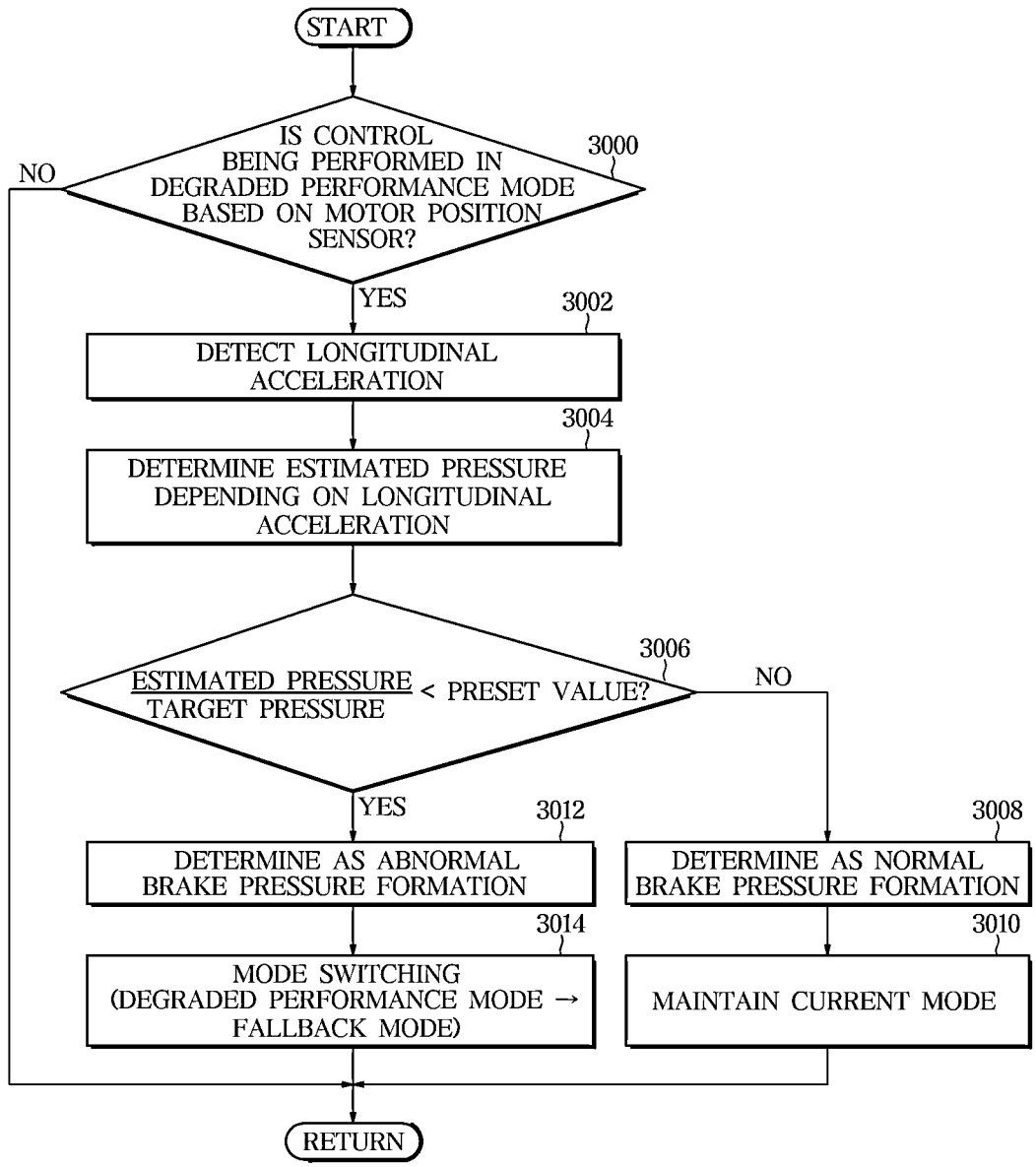
FIG. 9 illustrates a control method of an electronic brake system according to another embodiment.

FIG. 9 illustrates a control method of an electronic brake system according to another embodiment.

Referring to FIG. 9, the controller 80 may determine whether control is being performed in the degraded performance mode based on the motor position sensor (3000).

The controller 80 may detect a longitudinal acceleration of the vehicle through the longitudinal acceleration sensor LAS (3002).

The controller 80 may determine an estimated pressure depending on the detected longitudinal acceleration (3004).

The controller 80 may determine whether a ratio of the determined estimated pressure to the target pressure determined depending on the pedal displacement detected through the pedal displacement sensor PTS is less than a preset value (3006).

When the ratio of the determined estimated pressure to the target pressure is greater than or equal to the preset value as a result of the determination in operation 3006, the controller 80 may determine that the brake pressure formation is normal (3008), and may maintain the current degraded performance mode under control (3010).

On the other hand, when the ratio of the determined estimated pressure to the target pressure is less than the preset value as the result of the determination in operation 3006, the controller 80 may determine that the brake pressure formation is abnormal (3012), and may switch the braking mode from the degraded performance mode under control to the fallback mode so that emergency braking by the driver may be performed (3014).

Herein, the aforementioned controller and/or components thereof may include one or more processors/microprocessors combined with a computer-readable recording medium storing computer-readable code/algorithm/software. The processors/microprocessors may execute the computer-readable code/algorithm/software stored in the computer-readable recording medium to perform the above-described functions, operations, steps, and the like.

The above-described controller and/or components thereof may further include a memory implemented as a computer-readable non-transitory recording medium or a computer-readable temporary recording medium. The memory may be controlled by the aforementioned controller and/or components thereof, and may be configured to store data transferred to or received from the aforementioned controller and/or components thereof, or may be configured to store data to be processed or processed by the aforementioned controller and/or components thereof.

The disclosed embodiments may be implemented as computer-readable code/algorithm/software on a computer-readable recording medium. The computer-readable recording medium may be a computer-readable non-transitory recording medium such as a data storage device capable of storing data readable by a processor/microprocessor. Examples of computer-readable recording media include hard disk drives (HDDs), solid state drives (SSDs), silicon disk drives (SDDs), read-only memory (ROM), CD-ROMs, magnetic tapes, floppy disks, optical data storage devices. etc.

The invention claimed is:

1. An electronic brake system comprising:
a master cylinder configured to pressurize and discharge pressurized medium;
a reservoir coupled to the master cylinder and in which the pressurized medium is stored;
a hydraulic pressure supply device configured to generate a hydraulic pressure by moving a hydraulic piston forward or backward and having a first pressure chamber provided on a front side of the hydraulic piston and a second pressure chamber provided on a rear side of the hydraulic piston;
a hydraulic control unit configured to control a flow of the hydraulic pressure to be transmitted from the hydraulic pressure supply device to a wheel cylinder;
a longitudinal acceleration sensor configured to detect a longitudinal acceleration of a vehicle;
a pedal displacement sensor configured to detect a displacement of a brake pedal; and
a controller configured to control the hydraulic pressure supply device and the hydraulic control unit,
wherein the controller is configured to, in a degraded performance mode in which braking performance of the degraded performance mode is degraded more than braking performance of a normal braking mode and a first cut valve and a second cut valve are closed to close flow paths between a master cylinder and the hydraulic control unit, control the hydraulic pressure supply device based on a rotational force of a motor,
determine the hydraulic pressure generated by the hydraulic pressure supply device based on the longitudinal acceleration of the vehicle when controlling in the degraded performance mode,
determine a target pressure based on the displacement of the brake pedal,
during control in the degraded performance mode, determine whether brake pressure formation is abnormal based on the determined hydraulic pressure and the target pressure, and
convert the degraded performance mode to a fallback mode in which the pressurized medium discharged from the master cylinder is directly supplied to the hydraulic control unit when the brake pressure formation is abnormal, and
wherein the first cut valve and the second cut valve are installed in each of the flow paths.

2. The electronic brake system according to claim 1, wherein
the controller determines that the brake pressure formation is abnormal when the determined hydraulic pressure compared to the target pressure is lower than a preset value.

3. The electronic brake system according to claim 1, wherein
the controller warns a driver when the brake pressure formation is abnormal.

4. The electronic brake system according to claim 1, wherein the controller is configured to:
when the determined hydraulic pressure is determined to be normal while the degraded performance mode in which the braking performance of the degraded performance mode is degraded more than the braking performance of the normal braking mode is performed, maintain the degraded performance mode, and
when the determined hydraulic pressure is determined to be abnormal while the degraded performance mode in which the braking performance of the degraded performance mode is degraded more than the braking performance of the normal braking mode is performed, change a braking mode from the degraded performance mode to a fallback mode in which emergency braking is able to be performed by a driver.

5. An electronic brake system comprising:
a master cylinder configured to pressurize and discharge pressurized medium;
a reservoir coupled to the master cylinder and in which the pressurized medium is stored;
a hydraulic pressure supply device configured to generate a hydraulic pressure by moving a hydraulic piston forward or backward and having a first pressure chamber provided on a front side of the hydraulic piston and a second pressure chamber provided on a rear side of the hydraulic piston;

a hydraulic control unit configured to control a flow of the hydraulic pressure to be transmitted from the hydraulic pressure supply device to a wheel cylinder;
a pressure sensor configured to detect a pressure in a hydraulic circuit;
a motor position sensor configured to detect a rotational position of a motor;
a longitudinal acceleration sensor configured to detect a longitudinal acceleration of a vehicle;
a pedal displacement sensor configured to detect a displacement of a brake pedal; and
a controller configured to control the hydraulic pressure supply device and the hydraulic control unit,
wherein the controller is configured to convert a braking mode from a normal braking mode to a degraded performance mode in which a first cut valve and a second cut valve are closed to close flow paths between a master cylinder and the hydraulic control unit and configured to control the hydraulic pressure supply device based on the rotational force of the motor when the pressure sensor fails while the brake pedal is operated, determine the hydraulic pressure generated by the hydraulic pressure supply device based on the longitudinal acceleration of the vehicle when controlling in the degraded performance mode, determine a target pressure based on the displacement of the brake pedal, determine whether brake pressure formation is abnormal based on the determined hydraulic pressure compared to the determined target pressure, and convert the degraded performance mode to a fallback mode in which the pressurized medium discharged from the master cylinder is directly supplied to the hydraulic control unit when the brake pressure formation is abnormal, and
wherein the first cut valve and the second cut valve are installed in each of the flow paths.

6. A control method of an electronic brake system, which comprises a master cylinder configured to pressurize and discharge pressurized medium, a reservoir coupled to the master cylinder and in which the pressurized medium is stored, a hydraulic pressure supply device provided to generate a hydraulic pressure by moving a hydraulic piston forward or backward and having a first pressure chamber provided on a front side of the hydraulic piston and a second pressure chamber provided on a rear side of the hydraulic piston, and a hydraulic control unit provided to control a flow of the hydraulic pressure to be transmitted from the hydraulic pressure supply device to a wheel cylinder, comprising:
detecting a longitudinal acceleration of a vehicle through a longitudinal acceleration sensor;
in a degraded performance mode in which braking performance of the degraded performance mode is degraded more than braking performance of a normal braking mode and a first cut valve and a second cut valve are closed to close flow paths between a master cylinder and the hydraulic control unit, controlling the hydraulic pressure supply device based on a rotational force of a motor;
determining the hydraulic pressure generated by the hydraulic pressure supply device based on the detected longitudinal acceleration when controlling in the degraded performance mode,
determining a target pressure based on a displacement of the brake pedal detected through a pedal displacement sensor,
during control in the degraded performance mode, determining whether brake pressure formation is abnormal based on the determined hydraulic pressure and the target pressure, and
converting the degraded performance mode to a fallback mode in which the pressurized medium discharged from the master cylinder is directly supplied to the hydraulic control unit when the brake pressure formation is abnormal, and
wherein the first cut valve and the second cut valve installed in each of the flow paths.

7. The control method according to claim 6, wherein
in the determining of the braking mode, it is determined that the brake pressure formation is abnormal when the determined hydraulic pressure compared to the target pressure is lower than a preset value.

8. The control method according to claim 6, wherein
the determining of the braking mode comprises warning a driver when the brake pressure formation is abnormal.

* * * * *